Figure 1:
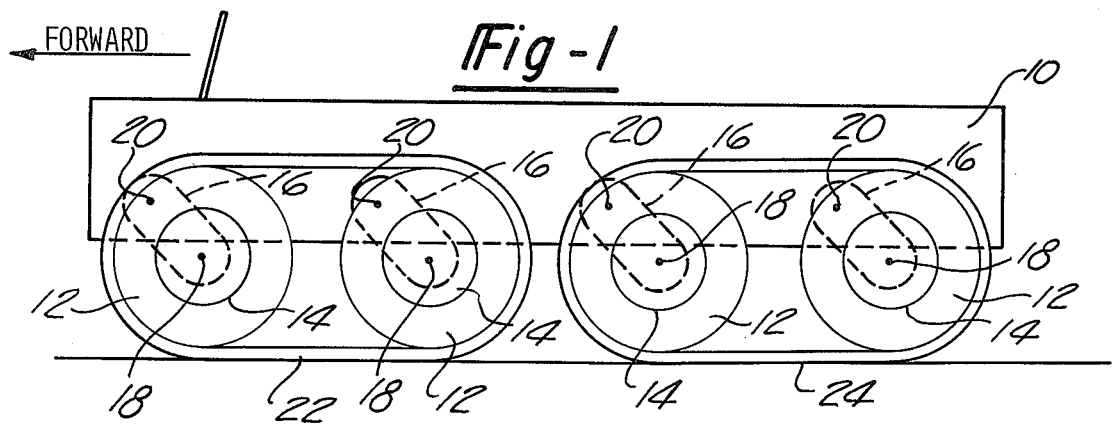

United States Patent [19]

Kopera et al.

[11] 3,930,553

[45] Jan. 6, 1976

[54] TRACK TENSION CONTROL

[75] Inventors: John F. Kopera, Troy, Mich.; William E. Lawson, Stillwater, Minn.; James P. Carr, Silver Spring, Md.

[73] Assignee: The United States of America as represented by the Secretary of the Army, Washington, D.C.

[22] Filed: Nov. 22, 1974

[21] Appl. No.: 526,195

[52] U.S. Cl. ............................. 180/9.28; 180/9.52
[51] Int. Cl.² ...................................... B62M 27/02
[58] Field of Search ............ 180/9.2 R, 9.26, 9.2 C, 180/9.28, 9.5, 9.52, 24.02; 280/28.5; 305/47–49

[56] References Cited
UNITED STATES PATENTS

| | | | |
|---|---|---|---|
| 1,355,853 | 10/1920 | Lothringen | 180/9.28 |
| 1,534,639 | 4/1925 | Engleman | 180/9.28 |
| 1,885,486 | 11/1932 | Smyth | 180/9.54 |
| 3,299,978 | 1/1967 | Sponsler | 180/9.52 |

*Primary Examiner*—Philip Goodman
*Attorney, Agent, or Firm*—John E. McRae; Peter A. Taucher; Robert P. Gibson

[57] ABSTRACT

A known vehicle normally operating on independently suspended trailing arms and pneumatic tires can be converted to a tracked vehicle by wrapping endless tracks around the tire tread areas in multiples of two. An expansible wheel-connector device is provided for causing the trailing arms and wheels to deflect in unison, thereby maintaining track tension and tire-track interengagement, minimizing uneven final drive torque loadings, and relieving the wheel bearing loads brought on by the addition of the track.

7 Claims, 6 Drawing Figures

$\overline{AC} = \overline{BD}$
$\overline{AB} = \overline{CD}$
$\angle \theta = \angle \alpha$

TRACK TENSION CONTROL

BACKGROUND AND SUMMARY

An existing off-road vehicle is equipped with eight road wheels carried on swingable suspension arms (four on each side of the vehicle); each road wheel can be driven by a chain or gear drive contained within the associated suspension trailing arm. It was thought that the vehicle could have improved mobility in soft terrain by providing endless treads or tracks around selected ones of the wheels, in the manner shown for example in U.S. Pat. No. 3,299,978 issued to W. B. Sponsler (see FIG. 6). However, problems in maintaining a degree of suspension and also track tension arose because the existing vehicle design provided for independent swinging movement of each suspension arm in accordance with momentary changes in the terrain; under certain conditions the wheel centerline spacing could be shortened sufficiently to produce track slack, possible untracking, and possible spinning of the wheels within the track.

The present invention is intended to provide an extensible connector between the wheels for maintaining wheel centerline spacing equal to the centerline spacing of the upper pivot points of the trailing arms, thereby creating a parallelogram arrangement that maintains a degree of suspension while preventing excessive looseness or play in the track. At the same time the connector accepts the compressive loads created by the track, thereby relieving loads on the wheel bearings.

THE DRAWINGS

FIG. 1 is a side elevational view of a vehicle suited for conversion from a wheel mode to a tracked mode. The vehicle is shown prior to installation of certain wheel-connector devices proposed under the present invention.

Figure 2:
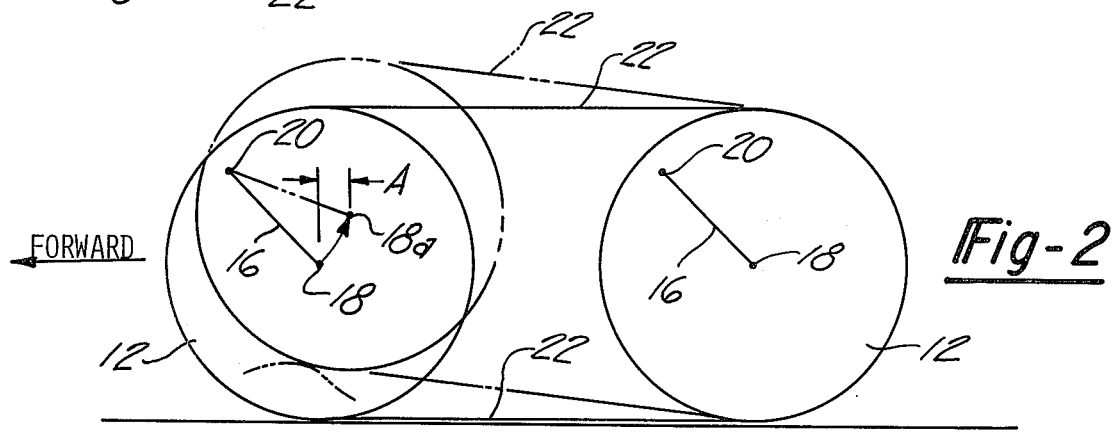
Figure 3:
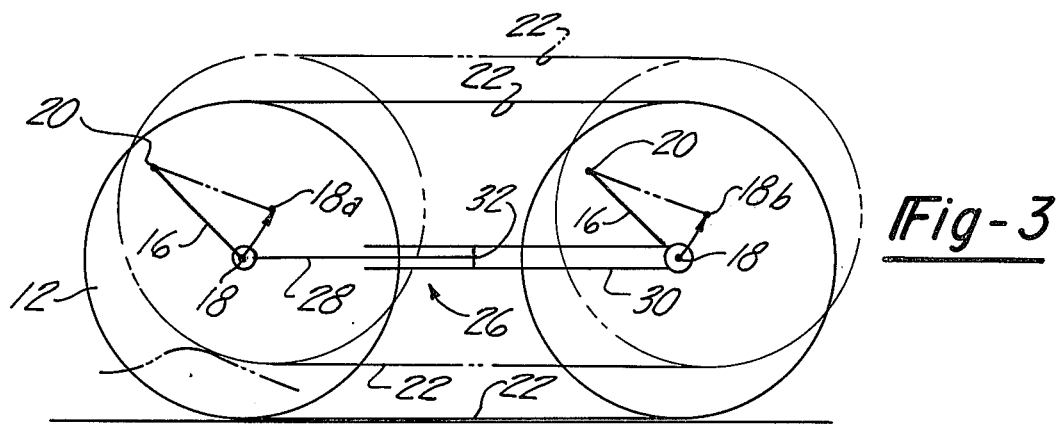

FIGS. 2 and 3 schematically compare two different wheel-track arrangements, one without the proposed wheel connector, and one with the proposed connector.

Figure 4:
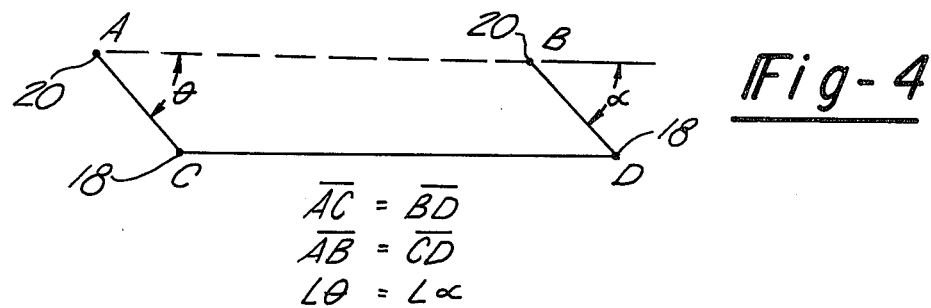

FIG. 4 is a schematic representation of a parallelogram linkage used in the FIG. 3 device.

Figure 5:
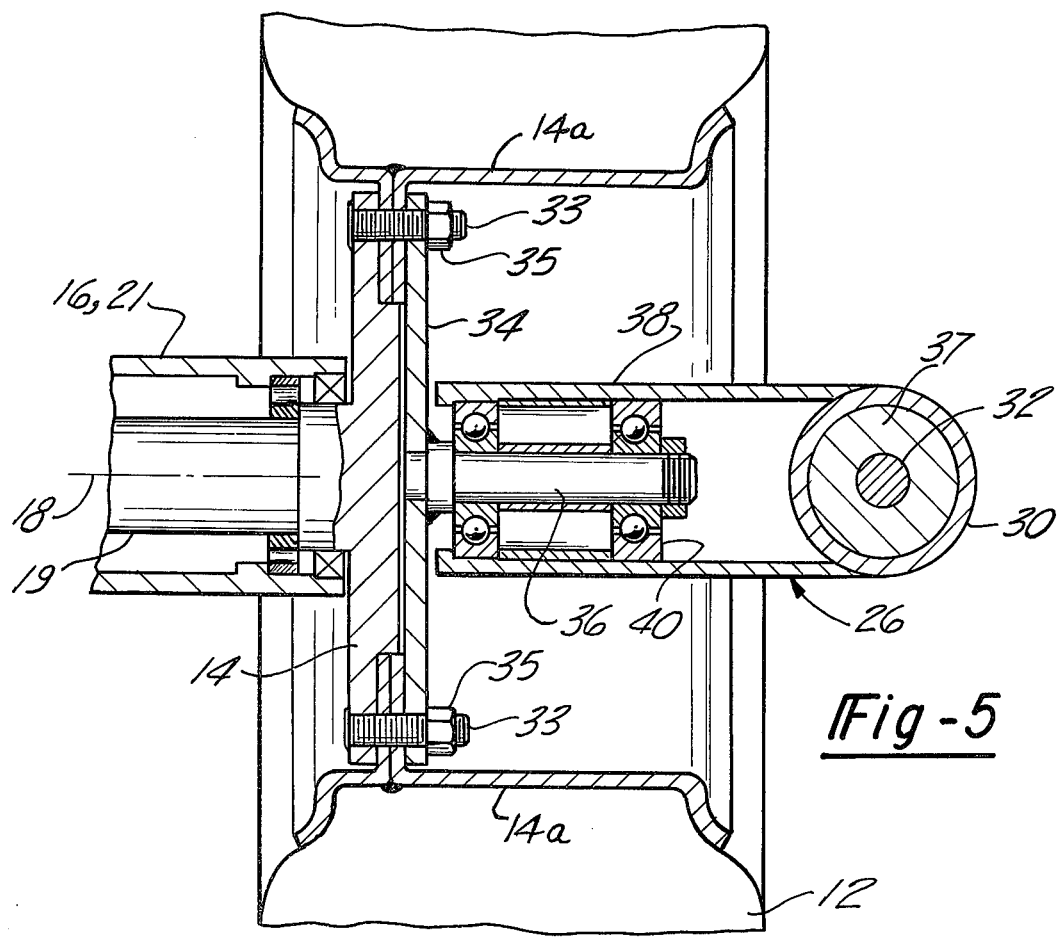
Figure 6:
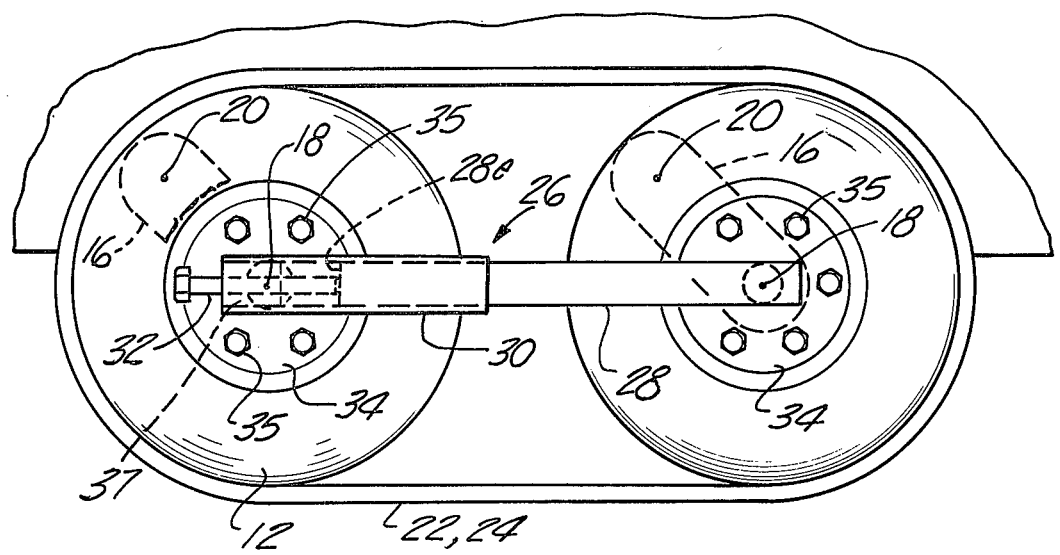

FIGS. 5 and 6 fragmentarily show one form of wheel connector contemplated under the invention.

FIG. 1

FIG. 1 shows in side elevation a vehicle comprising a hull 10 having four pneumatic tires 12 at each of its sides. Each tire is mounted on a wheel disc 14 that is supported for rotary movement around an axis 18 on a suspension trailing arm 16. Each arm 16 is arranged to swing in a vertical arc around a swing axis 20 located on hull 10. Torsion spring means (not shown) is interposed between each suspension arm pivot 20 and the hull to support and cushion the hull spring weight while permitting the associated wheels to deflect in accordance with terrain irregularities. The details of the torsion spring means are shown in copending U.S. Patent application Ser. No. 497,772 filed on Aug. 15, 1974 in the names of Harold T. Rose and Clarence D. Gilreath. Said copending application also discloses drive means extending within each suspension arm for powering the associated road wheel.

As seen in attached FIG. 1, the two frontmost tires 12 are encircled by an endless track 22, and the two rearmost tires 12 are encircled by an endless track 24. Similar endless tracks are provided at the non-visible side of the vehicle. The tracks may be constructed generally as shown in U.S. Pat. No. 2,739,017 issued on Mar. 20, 1956 to B. F. Arps. The tracks are installed on the wheels (tires) in anticipation of soft terrain conditions (snow, sand, mud etc.); under normal conditions the tracks are not used.

FIGS. 2 AND 3

FIG. 2 diagrammatically shows the potential effect that terrain irregularities have on the wheel centerline spacing. The normal run position is shown in full lines; the position after the frontmost wheel has encountered an obstruction is shown in dashed lines. As the front wheel deflects upwardly the front wheel rotational axis 18 moves to position 18a; in so doing the front wheel rotational axis moves closer to the rear wheel rotational axis by approximately the distance A. Distance 2A represents the potential slack generated in track 22 due to the particular terrain irregularity.

FIG. 3 diagrammatically illustrates the FIG. 2 wheel-track structure modified to include a telescoping connector mechanism 26 between the two wheel axles. As shown, mechanism 26 comprises a rod or relatively small diameter tube 28 swivably connected to the front axle, and a larger diameter tube 30 swivably connected to the rear axle; tube 30 is telescoped over tube 28 so that the tubes form a tying mechanism between the wheels. The free end of element 28 abuts against a stop 32 carried within tube 30. The position of stop 32 is adjusted so that the spacing between the wheel centerlines 18, 18 cannot be less than a predetermined distance. In practice the stop 32 is adjusted or located so that the wheel centerline spacing corresponds to the spacing between the two suspension arm swing axes 20, 20. With such an arrangement the two suspension arms swing in unison in the manner of the parallel bar linkage shown in FIG. 4.

Referring to FIG. 3, as the front wheel encounters an obstruction (to move the wheel centerline to position 18a) the wheel connector device 26 transmits a similar movement to the rear wheel axis (axle), thereby causing the rear wheel axis to approach position 18b. The original wheel centerline spacing is substantially maintained to thus prevent looseness or slack in track 22. The track tension prevents elements 28 and 30 from sliding apart.

Should the front tire encounter a depression in the terrain the front suspension arm 16 will tend to be rotated downward and forward in the clockwise direction about swing axis 20 (by the action of its torsion spring). The compressive forces generated by the track will prevent the track from expanding, and will at the same time draw the rear tire and its suspension arm downward and forward along the same line as the front tire, thereby maintaining a relatively constant tension on the endless track.

It is believed that connector 26 may have some beneficial action as regards level ride characteristic. When the front tire encounters an obstruction connector 26 transmits a corrective movement to the rear tire before the rear tire actually sees the obstruction; this apparently improves overall response time for the suspension system. When the front tire encounters a depression in the terrain the tensioned track tends to transfer the load onto the rear tire, thus minimizing the effect of the depression on vehicle attitude. Slight terrain irregularities may perhaps be accommodated by expansive-contractive action of the tires, without significant movement of the suspension arms; the tires exert some of the same cushioning effects that occur when the vehicle is operating in the wheeled mode (tracks removed).

FIGS. 5 AND 6

FIGS. 5 and 6 structurally illustrate one form of the connector device 26 schematically depicted in FIG. 3. As shown in FIG. 5, device 26 is associated with a road wheel or tire 12 having a wheel disc 14 connected to an axle 19 located on axis 18 within the barrel portion 21 of a suspension arm 16. Disc 14 is provided with studs 33 which accept nuts 35. When the vehicle is in the wheel mode nuts 35 lock the rim 14a to wheel disc 14. When the vehicle is in the track mode nuts 35 are used to lock the rim 14a on disc 14 and also to fasten a base plate 34 that constitutes part of the wheel connector 26. Plate 34 constitutes a base for a shaft 36 located on axis 18. During vehicle movement each wheel 12 rotates on its axis 18; each plate 34 and shaft 36 rotate with the wheel.

Each of the aforementioned tubular elements 30 or 28 is maintained in place by means of an attached barrel 38 that telescopes over shaft 36; suitable bearings 40 enable each shaft 36 to rotate wihout transmitting rotation to tube 30 (or tube 28). The wheel is designed so that bearings 40 are near the mid-plane of the tire; bearings 40 are thereby better able to handle radial loads created by the endless track. During wheel rotation elements tying 28 and 30 maintain the FIG. 6 position passing through the wheel centerlines 18, 18. Elements 28 and 30 cooperatively transmit wheel deflection forces from one wheel to another so that the wheels and trailing arms move in unison to prevent slack in the track.

Elements 28 and 30 are constructed as an extensible telescoping assembly to allow adjustment of distance CD (FIG. 4) to coincide with distance AB; an aim is to compensate for manufacturing tolerances, and also to facilitate installation and removal of the wheel-connector device. A stop screw 32 is threaded into a plug 37 carried within tube 30, whereby the end of the screw normally abuts the blunt end 28e of tube 28. During the process of installing connector device 26 on the wheels screw 32 may be adjusted from its final operating position to permit tubes 30 and 28 to have limited axial play, sufficient to enable the mounting plates 34 to align with studs 33 for securement of the plates by nuts 35. The track would usually be installed or wrapped on the tires after connector 26 has been attached to the two wheels. Normal procedure would be to drive the vehicle onto the tracks and then connect the free ends of the tracks together.

In use, the FIG. 5 device operates in the same fashion as the device of FIG. 3. Tubes 28 and 30 are maintained in a contracted condition by the forces generated by the endless track 22 or 24. Each shaft 36 (FIG. 5) rotates with the wheel; each sleeve 38 floats with the attached element 30 or 28.

FIGS. 5 and 6 illustrate one form of wheel-connector. It will be appreciated that minor variations in structure may be employed while still utilizing the inventive concept described in the appended claims.

We claim:
1. In a vehicle comprising a hull; at least two road wheels located at each side of the hull; a suspension arm for each road wheel; each suspension arm being independently swingably connected to the hull for movement about an individual swing axis; each road wheel being rotatably connected to the associated suspension arm for movement around an axis remote from the aforementioned swing axis; each wheel axis being spaced approximately the same distance from the associated swing axis; and an endless track encircling two adjacent wheels at each side of the hull to convert the vehicle to the tracked mode: the improvement comprising a rigid connector means extending between the wheels in each track-wheel unit, each connector means being compressively positioned between the associated wheels to keep said wheels operatively engaged with the encircling track; each connector means being effective to maintain the wheel axes spacing substantially equal to the swing axes spacing, whereby the suspension arms in each track-wheel unit move in the fashion of a parallel bar linkage when the vehicle is in the tracked mode.

2. In the vehicle of claim 1: each wheel connector means comprising telescoped elements connected to different ones of the wheels.

3. In the vehicle of claim 1: each wheel connector means comprising an outwardly projecting shaft carried by each wheel on the wheel axis, and a tie mechanism having rotary connections with the shafts so that the individual wheels can turn without restraint from the tie mechanism.

4. In the vehicle of claim 3: each wheel connector means further comprising a mounting plate for each shaft; each plate being removably attached to one of the vehicle road wheels by means of the existing wheel studs and nuts.

5. In the vehicle of claim 3: each wheel connector means further comprising a mounting plate 34 for each shaft; each plate being removably attached to one of the road wheels by means of the existing wheel studs and nuts; each tie mechanism comprising a sleeve 38 surrounding one of the aforementioned shafts, and anti-friction bearings 40 interposed between each shaft and the associated sleeve; said bearings being located within the associated wheel between its side edges.

6. In the vehicle of claim 1: each connector means comprising inner and outer tubes telescoped onto each other, each tube having a swivel connection with a different wheel in the respective track-wheel unit, whereby the individual wheels can turn without restraint from the telescoped tubes; the outer tube in each connector means having an internal stop 32 cooperating with an end of the inner tube to limit contractive movement of the tubes.

7. In the vehicle of claim 6: each stop 32 being adjustable along the axis of the associated outer tube.

* * * * *